May 31, 1966 A. FEROY 3,253,661
IMPELLER BLADE CONNECTION
Filed Jan. 21, 1965 2 Sheets-Sheet 1
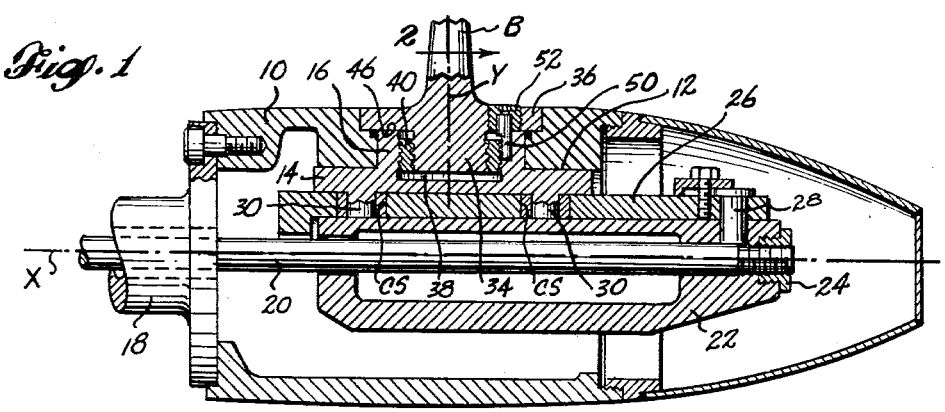
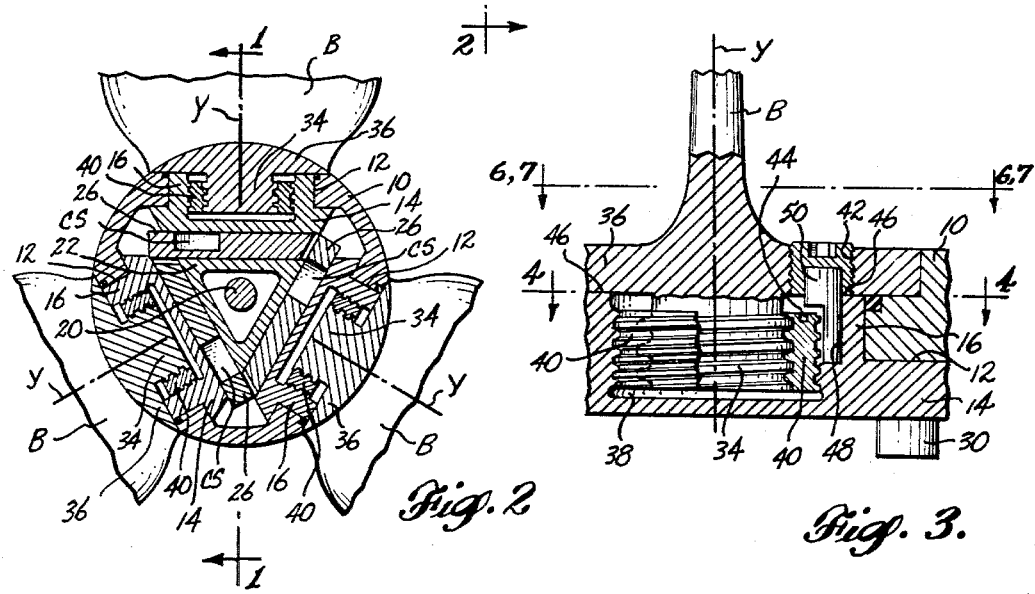
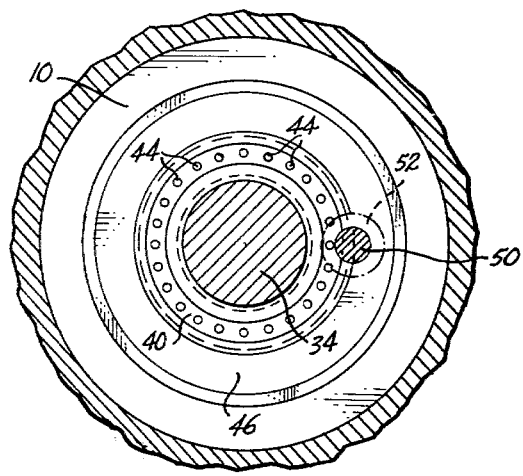
INVENTOR.
ARNE FEROY
BY Graybeal, Cole & Barnard
ATTORNEYS May 31, 1966 — A. FEROY — 3,253,661
IMPELLER BLADE CONNECTION
Filed Jan. 21, 1965 — 2 Sheets-Sheet 2

INVENTOR.
ARNE FEROY
BY Graybeal, Cole & Barnard
ATTORNEYS

United States Patent Office 3,253,661
Patented May 31, 1966

3,253,661
IMPELLER BLADE CONNECTION
Arne Feroy, 20017 42nd S., Kent, Wash.
Filed Jan. 21, 1965, Ser. No. 426,837
11 Claims. (Cl. 170—160.58)

The present invention relates to impellers, and more particularly to an improved manner of connecting impeller blades, such as are encountered in variable pitch marine propellers, for example, to their supporting hub structure.

In variable pitch propellers the several propeller blades are each connected to a rotatable support member carried by the hub, and means are provided for rotating the support members and blades in unison for varying the pitch of the propeller. In one known type of variable pitch propeller the propeller blades are merely bolted directly to the rotatable support member. This type of connection has proven to be unsatisfactory because the base portions of the blades and the hub are generally relatively small and will not permit the use of bolts large enough to withstand the centrifugal forces that are encountered during high speed rotation of the blades. Due to this size factor, small bolts must be used, and at the higher speeds they are often over-stressed and may break or become loose.

Another known manner of fastening propeller blades to the rotatable support members in the hub is illustrated by my prior U.S. Patent No. 2,763,329, issued September 18, 1956, and entitled Variable Pitch Propeller. The blades of the propeller disclosed by this patent are provided with threaded roots and such blades are connected to the rotatable support members by merely threading or screwing the roots into threaded sockets formed in the rotatable support members. This particular connection involves a relatively large diameter root and rather husky threads, and provides the necessary strength required at high speeds, but is unsatisfactory in other respects. Difficulties in achieving proper alignment of the propeller blades have been experienced with threaded connectors of this type. In order to function properly, the propeller blades must not only be solidly secured to their respective support members in the hub, but an exact blade alignment must be provided. The blades must be properly related to each other or otherwise the propeller will not function correctly, particularly at high speeds. In order to achieve correct alignment of the propeller blades, the threads must begin and end at exactly the same place on each root and in each socket, and the corresponding threads must be machined so accurately that they are essentially identical in all respects. It is possible to machine the parts with the accuracy needed, but such precision machining is both difficult and costly, and hence impractical. Furthermore, even if the necessary precision machining were done, so that the blades are perfectly aligned when the propeller is new, such correct alignment may be lost at a time when much useful life remains in the blades. The blades may become loose within their threads as a result of their being overloaded, or having struck foreign objects during operation. It is impossible without the use of shims to relocate the blades in their original positions while still having them remain tightly seated within the threaded sockets of their support members, and attempts to shim the blade back to its original position have proven unsatisfactory.

Accordingly, a principal object of the present invention is to provide a threaded connection between an impeller blade and its support structure, which includes means by which each blade may always be tightened or tightly seated in a position of correct alignment, with no precision machining being required.

According to the present invention, each blade is provided with a mounting flange and a threaded root projecting inwardly from such flange. A threaded socket opening, substantially larger in diameter than said root, is formed in a part of the hub structure An internally-externally threaded connector ring is threaded into the socket opening and the root of the blade is in turn threaded into said connector ring. Rotation of the connector ring in place causes it to move both in or out in said socket opening, and relatively along the blade root. When a blade is being installed or relocated, the connector ring is rotated until its internal threads are in such a position that when the blade is screwed in and tightly seated it is properly aligned. According to the present invention, a locating pin radially offset from the axis of the blade root is used in conjunction with an opening in the blade flange to establish a position of correct alignment.

Another object of this invention is to provide an impeller blade fastening mechanism that is compact, rugged in construction, involves few working parts, will withstand high rotational speeds and associated centrifugal forces without failure in operation, and which will also withstand impact loads due to the blade striking foreign objects during the course of operation.

A further object of the invention is to provide means by which a propeller blade may be securely locked in place in a position of proper alignment, regardless of whether the threads are damaged or not, or are perfectly formed, and by which new blades may be easily installed with the necessary alignment and rigidity.

Still another object of this invention is to provide an impeller blade connection of the character described that involves components which are simple in construction and few in number, and hence relatively easy and inexpensive to manufacture, but which at the same time are sufficiently strong and durable in use.

These, together with other objects and advantages which will become subsequently apparent, reside in the details of construction and operation of a typical embodiment of the invention presently to be described, with reference being made to the accompanying drawings, wherein like letters and numerals refer to like parts throughout, and in which:

FIG. 1 is a longitudinal sectional view taken through the hub of a variable pitch propeller assembly incorporating a typical blade connection according to the present invention, such view being taken substantially along the line 1—1 of FIG. 2;

FIG. 2 is a transverse sectional view taken substantially along line 2—2 of FIG. 1, such view showing said typical blade connection being used for connecting each blade of the illustrated three-blade propeller to its support member, such support member constituting a part of the means for varying the pitch of the propeller when in use;

FIG. 3 is an enlarged scale fragmentary view of the blade connection illustrated in FIGS. 1 and 2, partly in section and partly in elevation, such view showing the different pitch of the two sets of mating threads, and showing the locking pin and retainer cap in place;

Figure 6:
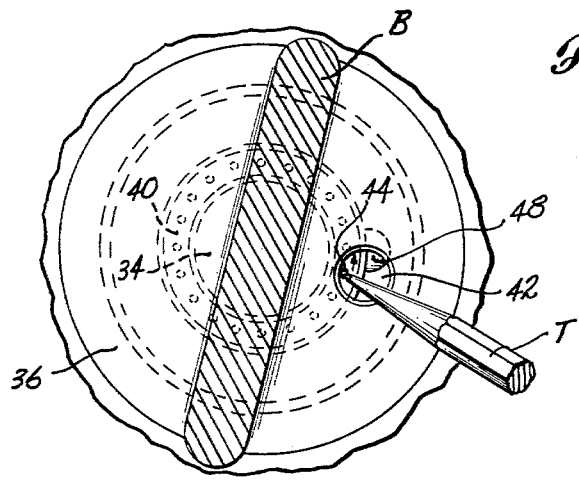
Figure 5:
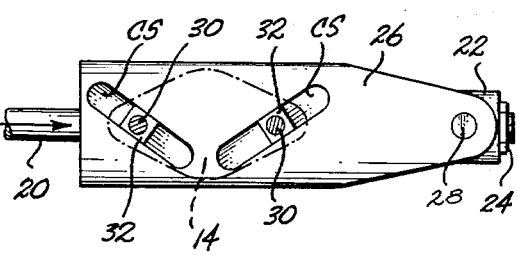
Figure 7:
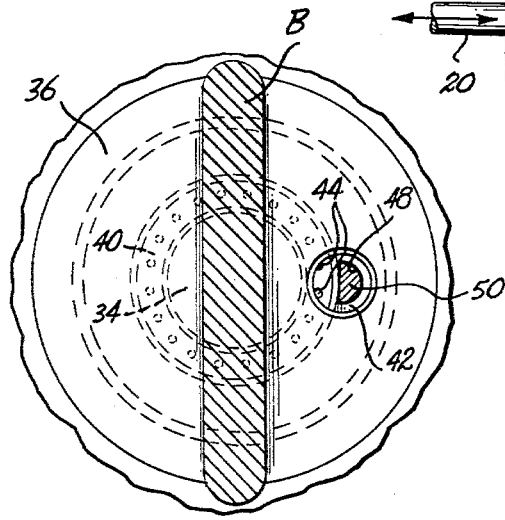

FIG. 4 is a transverse sectional view taken substantially along line 4—4 of FIG. 3, showing the dimples formed in the outboard end of the connector ring for the reception of the pointed tip of the tool used for turning the connector ring when both it and the blade are in place, showing the locking pin in place, and by phantom lines showing the relative position of the retainer plug when it is in place;

FIG. 5 is a plan view of a control plate forming part of the means for varying the pitch of a propeller blade when the propeller is in use; and FIGS. 6 and 7 are views taken along line 6,7—6,7 of FIG. 3, with the plug removed, with FIG. 6 showing the blade screwed home or seated in a position wherein the access opening is not in alignment with the locking pin socket, and showing a pointed tool being inserted through the access opening to be used for rotating the connector ring in order to correct the alignment, and with FIG. 7 showing the blade seated in a position of correct alignment, such view further showing a lower portion of the locking pin in place, and in section.

Turning now to a more specific consideration of the variable pitch propeller illustrated by the drawing, and incorporating a typical embodiment of the invention, in FIGS. 1 and 2 the propeller illustrated comprises three blades B mounted approximately one hundred and twenty degrees (120°) apart on a hub 10. Each blade B is connected, by means to be hereinafter described, to a rotatable support member 12 having a generally flat base flange 14 and a tubular neck 16. The neck 16 is sized to snugly rotate in a bore formed for it in a wall portion of the hub 10. The base 14 underlies that portion of the hub wall that immediately borders said bore.

The hub 10 is shown to be bolted to a flange at the aft end of a hollow shaft 18. A control rod 20 extends rearwardly through the hollow shaft 18 anud then into the hollow interior of hub 10, and through a central passageway formed in a control block 22 housed in hub 10. At its aft end the control rod 20 is suitably connected to the aft end of the control block 22, as by a threaded connector 24, for example.

As perhaps best shown by FIG. 2, the control block 22 has a triangular cross-sectional shape, giving it three outwardly directed sides or faces, each of which extends substantially perpendicular to the axis of the blade B with which it is associated.

Control plate 26 is located in the space between each control block 22 and the base flange 14 opposing it. The control plates 26 are connected to the control block 22 by a single pivot pin 28, located near the aft end of the assembly (FIGS. 1 and 5). Cam slots CS are formed in the control plates 26, and control pins 30 extend inwardly from the base flanges 14 of the rotatable support members 12 and operably engage sliding blocks 32 positioned in said cam slots CS (FIG. 5, for example).

In operation, axial movement of the control block 22 by the control rod 20 is transmitted by the pivot pins 28 to the plates 26 whose cam slot CS then transmits the motion to the sliding blocks 32, and hence to the control pins 30 to rotate the support members 12 and the blades B connected thereto. As will be evident, a pull on the rod 20 will cause counterclockwise rotation of the blades B, and a push will cause clockwise rotation. For a more detailed disclosure of the pitch varying mechanism, reference is made to my aforementioned U.S. Patent No. 2,763,329, the disclosure of which is hereby expressly incorporated herein by reference.

According to the present invention, each blade B is provided with a threaded root of relatively large diameter extending radially inwardly from a flange 36 forming a base for the blade. A threaded socket opening 38 is formed in the tubular neck portion of each support member 12. As clearly shown by FIGS. 1–3, the threaded socket opening 38 is substantially larger in diameter than the threaded root 34. According to the present invention, an internally-externally threaded connector ring 40 is disposed in said socket opening 38 in concentric surrounding relationship to the root 34, and serves to rigidly connect said root 34, and hence the blade B, to the support member 12. The internal threads of the connector ring 40 mate with and turn on the root threads, and the external threads of such ring mate with and turn in the socket threads. The connector ring 40 is threadable both in-and-out in said socket opening, and relatively along the blade root. An access opening 42 is provided in the base flange 36 of the blade B at a location spaced radially outwardly from the root axis (designated Y in FIGS. 1–3). A circular array of dimples 44 or the like are provided on the outboard end of connector ring 40. The connector ring 40 is rotated when both it and the blade are in place by inserting a sharp pointed tool T (FIG. 5) through said opening 42 in base flange 36 and into one of the accessible dimples 44, and then pushing on the tool in the direction of desired rotation.

As previously mentioned, the inner surface of the blade flange 36 should tightly seat on the outboard end surface 46 of the tubular neck 16, when the blade B is at the desired pitch relative to the hub 10. The connector ring 40 provides a way of angularly moving the set of threads into which the threaded root 34 of blade B is screwed, so that proper alignment and tight seating will both occur at the same time.

A locking pin receiving socket 48 is formed in the tubular neck portion 16 of each support member 12. The location of the socket opening 48 is such that when the access opening 42 in the blade flange 36 is aligned with it, and at the same time the blade B is tightly seated against the outboard end surface 46 of neck 16, the blade B is properly set or positioned relative to the other blades B, and to the axis of propeller rotation (designated X in FIG. 1).

As clearly illustrated by FIGS. 3 and 4, the locking pin socket opening 48 is generally semi-cylindrical in shape, and the lower portion of the locking pin 50 is similarly shaped. The locking pin 50 has a generally cylindrical outer end portion which projects outwardly into the access opening 42 in blade flange 36. The locking pin 50 is held in place by a retainer cap 52. A blind bore formed in the inboard portion of retainer cap 52 engages and snugly accommodates the outer end portion of the locking pin 50.

A procedure for adjusting or correctly aligning the propeller blades B will now be described. Let it be assumed that the aforementioned parts are completely assembled as illustrated by FIG. 3, for example, with the exception of locking pin 48 and retainer cap 52, which are both removed, and that both sets of threads consist of right hand threads. The propeller blade B is rotated clockwise (causing its root to be threaded into the connector ring 40) until the inboard surface of its flange 36 seats tightly against the outboard end surface 46 of the support member neck 16. If the blade B seats in a non-aligned position, i.e. the access opening 42 in the blade flange 36 is not centered over locking pin socket opening 48, then the connector ring 40 must be rotated in order to establish proper alignment at the same time that the propeller blade B is tightly seated.

In the drawing the internal threads of the connector ring 40, and the root threads mating therewith, are shown to be coarser and larger in pitch than the external threads of the connector ring, and the socket threads mating therewith. By virtue of this arrangement, when rotated the connector ring 40 travels at a faster rate relatively along the blade root 34 than it travels in-or-out in the socket opening 38. Referring to FIG. 6, and assuming that the condition of misalignment that is illustrated exists when the blade B is screwed in tight (i.e. is tightly seated) against the outboard end surface 46 of the support member neck 16, the connector ring 40 must be rotated in the counterclockwise direction, as indicated by the arrow, in order to cause proper alignment to occur simultaneously with tight seating. Counterclockwise movement of the connector ring 40 causes it to move relatively outwardly along the blade root 34 (or the blade root 34 moves relatively into connector ring 40) and also relatively outwardly in the socket opening. However, because of the aforementioned pitch differential, the connector ring 40 travels axially along the blade root 34 at a faster rate than it travels in the socket opening 38. Hence, as ring 40 is rotated counterclockwise there is a net downward movement of the blade B, causing it to seat ahead of the position shown in FIG. 6. The connector ring 40 is rotated or adjusted until the blade seats tightly in place with access opening 42 centered over the locking pin socket opening 48.

Although the blade connection of the present invention has been described in conjunction with variable pitch marine propellers, it is to be understood that it is not limited to such use, but rather may be advantageously employed with fixed pitch propellers, and with other types of impellers, such as are encountered in pumps, compressors, and fans for example.

The foregoing is to be considered as merely illustrative of the structural embodiments incorporating the principles and features of the present invention, and therefore is not to be construed as being limitive in nature. Since changes, variations, and modification in the form, construction, and arrangement of the blade connection shown and described may be made without departing from the spirit of the invention, it is to be understood that the invention is to be limited solely by the scope of the following claims.

What is claimed is:

1. In combination, a hub having a peripheral wall portion formed to include a radial bore; an impeller blade having a flange overlying a portion of said wall, immediately bordering said bore, and a threaded root, substantially smaller in diameter than said bore, projecting radially inwardly from said flange into said bore; a blade supporting member in said hub having a base flange underlying a portion of said wall, immediately bordering said bore, and an internally threaded tubular neck projecting radially outwardly from said base flange, and fitting in said bore, in spaced, surrounding relationship to said root; and means for rigidly connecting said blade to said supporting member, at a selected angular position relative thereto, with the outer end of said tubular neck contacting the inner surface of said flange, said means comprising an internally-externally threaded connector ring located in the tubular neck between it and said root, and being rotatable relative to said peripheral wall portion, to said tubular neck, and to said root, so as to be threadably movable both in-and-out in said tubular neck, and relatively along said root.

2. The combination of claim 1, wherein an access opening is formed in the blade flange at a location that is offset radially outwardly from the axis of said root, generally above said connector ring, and wherein said connector ring is formed to include means on its outboard end against which a tool inserted through the access opening may be urged in order to rotate the connector ring when the blade is in place.

3. In combination, an impeller blade having a mounting flange and a threaded root projecting radially inwardly from said flange; a blade supporting member having a threaded socket opening, substantially larger in diameter than said root, in which said root is centrally received; means for rigidly connecting said blade to said support member, at a selected angular position relative thereto, said means comprising an internally-externally threaded connector ring in the socket opening between said root and said supporting member, and being threadably movable both in-and-out in said socket opening, and relatively along said root; with an access opening being formed in the mounting flange of said blade, generally above the connector ring and the supporting member where it immediately borders said connector ring, with the outer end of said connector ring being formed with means against which the end of a tool inserted through the access opening may be urged for the purpose of rotating the connector ring relative to the blade and supporting member, and with said supporting member being formed to include a locking pin receiving socket that is alignable with said access opening in the base flange of the blade; and a locking pin in both said access opening and said locking pin receiving socket.

4. The combination of claim 3, wherein the locking pin is smaller in diameter than the access opening, the access opening is threaded, and said combination further includes a retaining cap that is threadably received in said access opening and includes an inwardly opening blind bore that surrounds and engages the outer end portion of the locking pin.

5. The combination of claim 3, wherein the locking pin receiving socket in the support member is substantially semi-cylindrical in shape, and the inner portion of the locking pin is of substantially the same shape and size.

6. The combination of claim 5, wherein the locking pin has a generally cylindrical upper portion, and the combination further includes a cap screw threadable into said access opening and having an inwardly opening, substantially cylindrical, blind bore in its lower portion that surrounds and snugly engages the said upper portion of the locking pin.

7. In combination, an impeller blade having a threaded mounting root and a flange, immediately outboardly of said root, having an inboard surface; a blade supporting member having a socket opening, substantially larger in diameter than said root, in which said root is received, and an outboard end surface that bears against the said inboard surface of the flange when the blade is inserted in place; threaded means for connecting said blade to said supporting member and comprising a connector ring, angularly movable within said socket opening and having internal threads mating with the mounting root threads; and means enabling relative angular movement between said connector ring and said socket opening at an axial rate different than the axial rate of movement of the mounting root threads in the connector ring, with an access opening being provided in the flange above the connector ring, and with the outer end of said connector ring being formed to include means against which the end of a tool inserted through the access opening may be urged for the purpose of rotating the connector ring relative to the blade and supporting member.

8. The combination of claim 7, wherein the supporting member is formed to include a locking pin receiving socket that is alignable with the access opening in the flange of the blade, and the combination further includes a locking pin insertable through said access opening into said locking pin receiving socket, and means for retaining said locking pin in its socket.

9. The combination of claim 8, wherein the latter mentioned means comprises a retaining cap that is threadably received in said access opening and includes an inwardly opening blind bore that surrounds and engages the upper end portion of the locking pin.

10. An impeller blade connectable to a support member having a threaded blade root socket and a locking pin socket located substantially at the periphery of the blade root socket, by an internally-externally threaded connector ring that is threadably movable in-and-out in the blade root socket, and by a locking pin, said blade comprising: a mounting flange that is wide enough to overlie the locking pin socket of such a support member, and a threaded blade root that projects inwardly from said flange and is threadable into a connector ring in the blade root socket of such a support member, with an access opening being formed in the mounting flange of the blade at a location radially outwardly from the axis of the root, which opening is alignable generally over the locking pin socket of such a support member, and with said access opening being internally threaded for the reception therein of a threaded locking pin retaining element.

11. The impeller blade of claim 10, wherein the axis of the access opening is substantially parallel to the axis of the blade root, and the inner surface of the blade flange is substantially planar.

References Cited by the Examiner

UNITED STATES PATENTS

| | | | |
|---|---|---|---|
| 2,054,810 | 9/1936 | Gaba | 170—173 |
| 2,763,329 | 9/1956 | Feroy | 170—160.47 |

FOREIGN PATENTS

| | | |
|---|---|---|
| 476,941 | 5/1929 | Germany. |
| 295,813 | 8/1928 | Great Britain. |
| 546,510 | 7/1942 | Great Britain. |

MARK NEWMAN, *Primary Examiner.*

JULIUS E. WEST, *Examiner.*

W. E. BURNS, *Assistant Examiner.*